July 10, 1956 T. O. ANDERSON 2,754,016
SELF LOADING AND UNLOADING LOGGING DEVICE
Filed Nov. 13, 1952 2 Sheets-Sheet 2
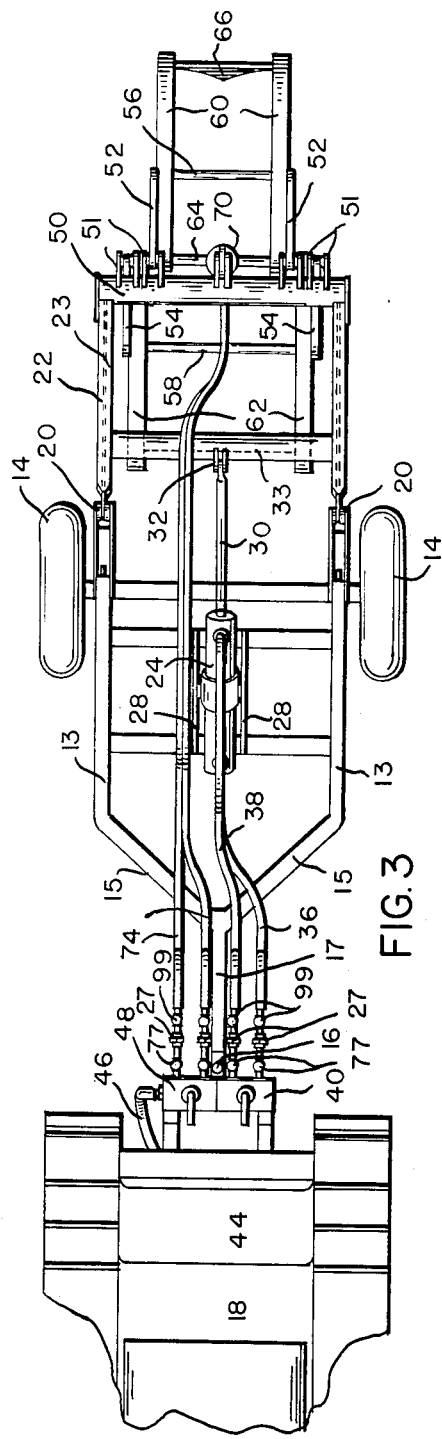
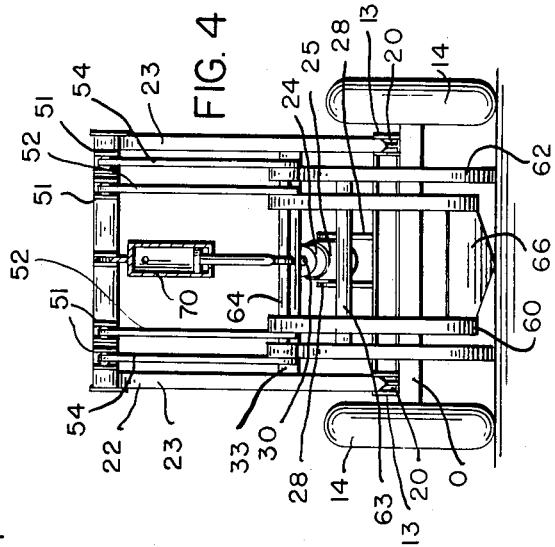
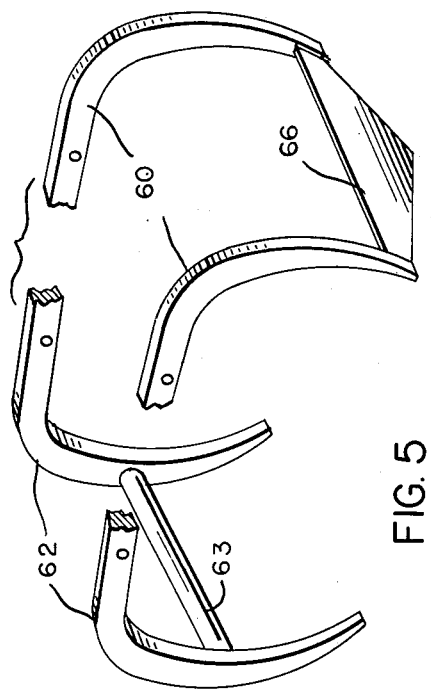
INVENTOR
T. O. ANDERSON
BY
Richard P. Cardew
AGENT United States Patent Office 2,754,016
Patented July 10, 1956

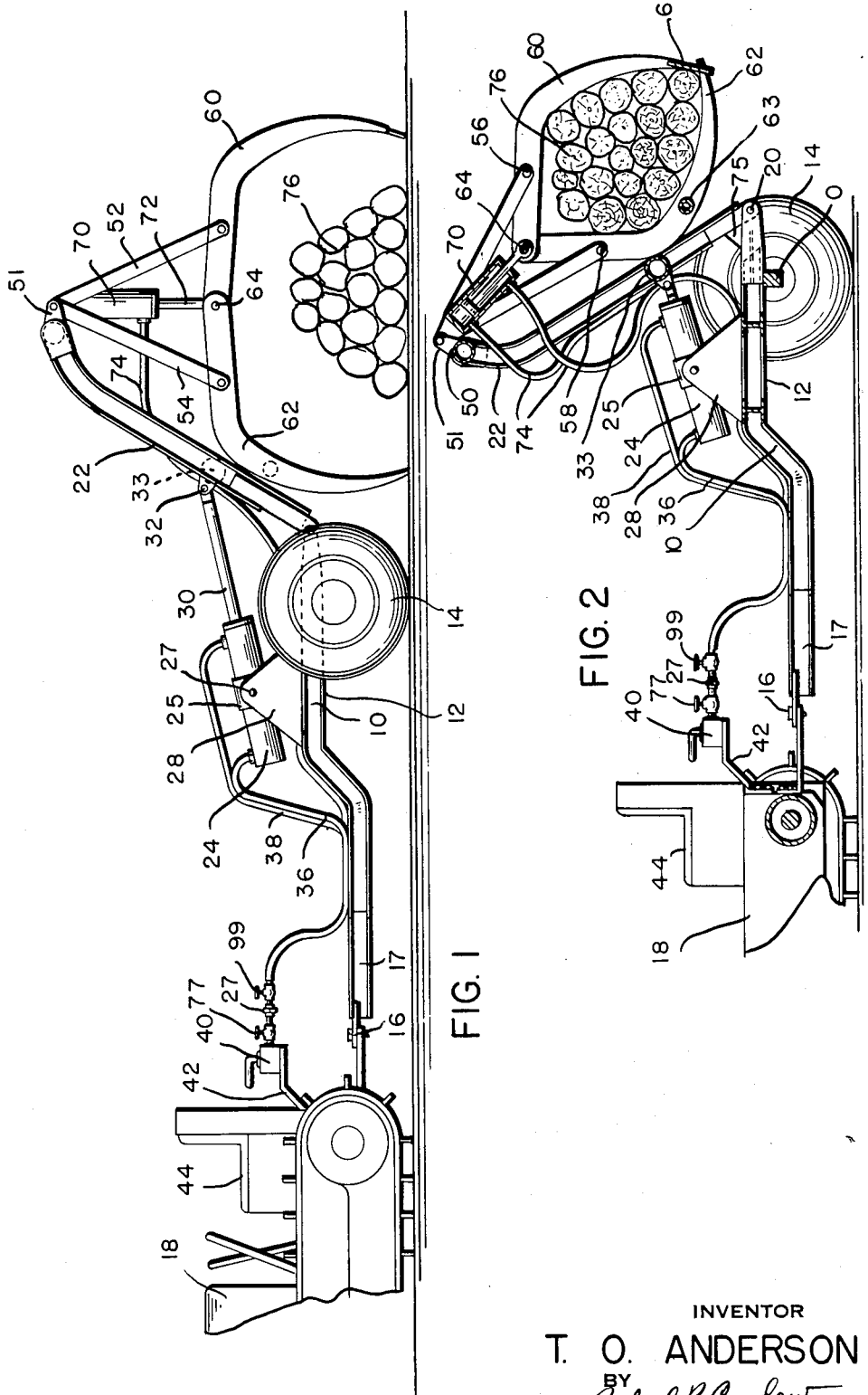

2,754,016

SELF LOADING AND UNLOADING LOGGING DEVICE

Theodore O. Anderson, Two Harbors, Minn.

Application November 13, 1952, Serial No. 320,295

3 Claims. (Cl. 214—147)

This invention relates to a new and useful self-loading and unloading device for transporting logs, pulpwood, or the like.

It is well known that common methods of handling logs, pulpwood and the like require the cutters to pile the logs and pulpwood in relatively small piles in close proximity to the point the trees are felled and cut to length, this results in a large number of small piles being scattered here and there throughout a cutting area, the piles sometimes being close together if there is a lot of wood cut in a small area. This practice is employed because it would be impractical to move the cut pieces very far by hand and the cutters would not be able to cut much wood if they had all the moving and handling to do. Cutters are usually paid "by the piece or cord" and would object to any work which kept them from cutting.

The small piles are, therefore, removed from the woods by other workers. The most common practice is for a tractor to pull a dray or sled behind it through the woods from one pile to the next where the wood is loaded by hand from the piles on to the dray. One man drives the tractor and usually another man goes along to help with the hand loading and unloading of the dray. The drays usually hold about one cord of wood and are narrow and low in structure.

Each time the dray is loaded it must be pulled by the tractor to a main road or landing where large quantities of wood are assembled for bulk hauling and loading.

There may be a power device at the landing to unload the dray if a sufficient quantity of draying is being done there, however, in most cases the unloading is done by hand.

This loading and unloading by hand is hard and heavy work and it is difficult to get anyone to hire out for this job, men would rather do other jobs, even at less pay. In addition, it takes quite a bit of time to load and unload the dray and the tractor is idle during this time. The labor cost and having the tractor idle increases the cost of the wood.

It is therefore, one of my principal objects to provide an improved means for transporting logs, pulpwood, or the like through the woods wherein the load is ideally carried or transported.

Another object is to provide a self-loading and unloading device for carrying wood or the like.

Another object is to provide such a device which may be readily attached to or disconnected from any tractor and which is adapted for use and operation with any tractor.

Another object is to provide such a device which is powered by and operated from the tractor and which requires the least modification of the tractor in doing so, it being noted that there have been made and patented tractor carried devices for loading various materials, however, the tractor usually must be provided with longer tracks, or other expensive modifications in order to carry the loader. This usually renders the tractor unusuable for its normal functions unless a great deal of time is spent to remove the loader and replace the original equipment of the tractor. My device can be attached to or removed from a tractor in a minimum of time and with a minimum of effort.

It is also to be noted that common tractors are not made to carry a load, particularly over rough terrain such as is encountered in the woods, such as a load of pulpwood or the like. Undue strain is made on the tractor if it is required to carry the loading unit as well. Tractors are made to pull loads, and my device attaches to and is pulled by a tractor so that the latter is not overloaded nor are excess strains applied thereto.

Another more specific object of my invention is to provide a self-loading and unloading log or pulpwood carrier wherein the load is supported in a fixed or substantially rigid position during its transportation to eliminate excessive sway or swing of the load which might cause tipping the load over or losing a part of it along the way.

Another more specific object is to provide a frame which is attached to a tractor to be towed thereby, traction elements for the frame, either wheels or runners, a boom vertically pivotally carried on the end of the frame rearwardly of the center of the traction elements, a grapple unit carried on the outer end of the boom, and means to operate the boom and the grapple to pick up, hold for transportation, and put down a load of wood or the like.

Another object is to provide such a device which is hydraulically operated and controlled.

Briefly, the invention comprises a frame which has suitable traction elements such as wheels or runners and is adapted so as to be drawn by a tractor, and on which is vertically pivotally mounted a boom carrying a grapple, both the boom and the grapple being actuated by hydraulic cylinders having control valves conveniently mounted adjacent the seat of the tractor.

The above more important objects and features and other objects and features will become apparent as this specification proceeds.

In the accompanying drawings forming a part of this application:

Fig. 1 is a side elevational view of my invention attached to a tractor and ready to pick up a load.

Fig. 2 is a view similar to Fig. 1 partly in section and showing the device with a load in carrying position.

Fig. 3 is a top plan view of Fig. 1.

Fig. 4 is a rear elevational view of Fig. 1.

Fig. 5 is an enlarged fragmental perspective view of the grapple units.

Like characters of reference are employed to designate like parts in the specification and throughout the several views, and for convenience, the word "wood" should be construed to include, logs, pulpwood, slabs and products capable of being handled and carried by the device herein described.

Referring now to the accompanying drawings in detail, the device is designated generally by the reference character 10 and embodies in its construction a frame 12 provided with a pair of traction elements such as the wheels 14 or runners not shown. The device is connected by a hitch 16 to any suitable tractor 18. The traction elements 14 are mounted on a suitable axle O which is rigidly fixed to the frame adjacent the rear end of the frame as shown, the reason for which will become apparent.

The frame is preferably made of a pair of spaced frame members 13—13 which are joined at their forward ends by inclined frame members 15—15. The frame has a stepped construction, as shown so that the hitch 16, which is carried at the forward end of the frame on a tongue 17 fixed to and extending forwardly from the point where the members 15—15 unite may be coupled to the tractor readily and yet the frame and axle will be high enough off the ground to clear obstructions such as stumps, rocks and the like and rough terrain may be readily traversed.

Suitable bracing, not shown, may be provided to rigidify the frame, of course.

At the rear end of the frame 12, preferably at the outer end of each of the frame members 13—13, a pivotal mounting 20 is provided to carry an upwardly extending boom 22 which is pivotal on the mountings 20 so that it may be swung upwardly and downwardly. The boom 22, as shown, comprises a pair of similar frame members 23—23, each of which is carried in one of the mountings 20, the members 23 being held in spaced, substantially alined and parallel relationship to each other by suitable bracing extending therebetween. Each of the members is pivotally connected with one of the mountings 20 so as to be pivotally operable by a hydraulic cylinder mechanism such as the hydraulic cylinder 24. The cylinder 24 is pivotally carried substantially centrally thereof by a bracket 25 fixed to the cylinder and having a stub shaft 27 extending laterally therefrom on each side of the cylinder. A pair of spaced upstanding brackets 28—28 are provided on the frame substantially centrally of the width of the frame and forwardly of the pivotal mounting of the boom and forwardly of the wheels or traction elements on the frame, as shown, and the piston rod 30 of the cylinder 24 terminates in a pivotal connection 32 to the transversely disposed brace member 33 fixed between the spaced members 23—23 in an outwardly spaced position on the boom, relative to the pivotal mounting of the boom on the frame so that the reciprocation of the piston rod will cause the outer end of the boom to be raised and lowered.

The cylinder 24 is double-acting and is connected by a pair of flexible hoses 36, 38 to a double-acting control valve 40 supported by a bracket 42 on the tractor 18 adjacent the tractor seat 44. Hydraulic fluid is delivered to the valve 40 by a hose 46 connected to a pump (not shown) on the tractor.

The hose 46 also delivers hydraulic fluid to another valve 48 which is mounted on the bracket 42 adjacent the valve 40 and the purpose of which will be hereinafter described.

The boom members 23—23 are preferably similarly arcuately shaped at their upper ends, as shown, and carry a transverse rod 50 therebetween. Suitable lugs 51—51 are provided for two pairs of links 52, 54 which are pivotally mounted on the rod 50 and extend downwardly therefrom, one pair of links adjacent each of the boom members 23. The lower ends of these links are attached by transverse shafts 56, 58 respectively, to the respective units, 60, 62, of a grapple.

Each of these grapple units consists of two transversely spaced, arcuate arms, which have their upper or inner ends pivotally mounted on a transverse fulcrum shaft 64, and while the arms of the grapple unit 60 are connected together at their lower ends by a transversely extending scooping blade 66, the lower ends of the arms of the grapple unit 60 are free and open and are disposed further apart than the arms of the unit 62, to receive the unit 62 therebetween when the grapple is closed making it possible for the grapple to securely hold in its grip less than a full load, if such is necessary, for example, when finishing off what is left of a pile and going to another to complete the load or in sparse stands of timber where small piles are made two or more piles may be picked up without danger of losing the smaller load when moving from one pile to another. A transverse brace 63 is provided between the members of the grapple unit 60 in spaced relation to the ends thereof for rigidity and unity of action.

As is shown in Figures 1 and 3, the opening and closing of the grapple is effected by means of a hydraulic cylinder 70 which is pivotally connected to the transverse rod 50 of the boom 22 and has a piston rod 72 connected to the transverse shaft 64 of the grapple. The cylinder 70 is operatively connected by a pair of flexible hoses 74 to the aforementioned control valve 48.

When the invention is placed in use, the tractor backs the frame to a pile of wood with the grapple suspended over the pile. The control valve 48 is actuated so as to slide the piston rod 72 out of the cylinder 70, whereby the grapple will be opened as shown in Figure 1. The control valve 40 is then actuated so as to cause the cylinder 24 to lower the boom 22 so that the grapple is disposed over a pile of logs with the members 60 and 62 on opposite sides of the pile as indicated at 76. Thereupon, by again actuating the valve 48 so as to close the grapple, the logs 76 will be embraced by the grapple and tightly gripped so that the boom 22 may subsequently be raised to lift the load off of the ground. The boom is pivoted vertically until the members 23 engage angular stops or rests 75 fixed to the frame members and the grapple rests on the transverse bracing of the boom, as shown, so that the load and boom are firmly rested in a substantially rigid carrying position and the center of gravity of the load and the boom and grapple is substantially centered over the traction elements 14 of the trailer device. The boom members 23—23 are arcuately shaped as shown to permit the cradling of the grapple over the load for lifting without having an excessively long boom and to permit cradling of the load over the wheels as shown.

As may be seen in Fig. 3, the center of gravity of the trailer device and its appurtenances and load is substantially over the axle O whereby all of the weight is carried on the trailer itself. The tractor pulls the load only.

Because the load is securely embraced and firmly held in a substantially rigid position on the trailer, there is little chance for the load to be lost and rough terrain can be easily and conveniently traversed. Because the axle O is relatively higher off the ground than a common dray, the device can be used in more places and with wider loads than can a dray which readily hangs up on stumps or the like. The tractor is free to travel without restriction of load or modifications.

It is deemed readily apparent that the instant device may be readily connected to a tractor by coupling the hitch 16 and connecting the hydraulic lines to the valves at the coupling 27 and turning on the shut off valves 77 and 99 on each side of the coupling. The disconnecting of the device is the reverse, of course. Little time or effort is required for this operation. The tractor is ready for instant use at any desired task as soon as the trailer device is disconnected.

The trailer is short, relatively light, high off the ground, and easy to maneuver as well as easy and convenient to operate.

With the instant device it is possible to move many more cords of wood per day with only one man working at the job for the tractor operator can load, unload, and transport his load without leaving his seat. No time is spent handling the wood by hand thereby the time formerly employed in hand loading and unloading is used for transporting the loads and the device easily carried an average dray load of wood. It takes but a few seconds to load or unload the instant device. One man's labor is saved entirely.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

What is claimed as new is as follows:

1. A wood handling and transporting device of the character described comprising frame means lying in a substantially horizontal plane, connecting means at the forward end of said frame means for connecting same to a tractor or the like, traction means mounted on opposite sides of and adjacent the rear end of said frame means to support and permit the movement of said frame means over the terrain, upwardly extending boom means mounted at one end to the rear free end of said frame means in pivotal relationship therewith, double acting piston means mounted on said frame means forward of said traction means, the piston arm of said piston means connected at its free end to said boom means at a point below the approximate midpoint of the boom means for vertically pivoting said boom means to both sides of a vertical plane over its pivotal point, grapple means connected to said boom means, said grapple means including a pair of coacting jaw units pivotally joined and movable toward and away from each other, and means for moving said jaw units to open and close said grapple, the vertical pivotal movement of said boom means forward of said pivotal point being limited in order for the grapple means when carrying a load to be cradled against the boom means so that the load and boom means are firmly rested in a substantially rigid carrying position above the traction means and the center of gravity of the load, the boom means and the grapple means being substantially centered over the traction means.

2. A wood handling and transporting device of the character described comprising rigid frame means lying in a substantially horizontal plane, said frame means including rearwardly extending spaced side members connected at their forward ends by a front frame member, connecting means secured to the front frame member for connecting the frame means to a tractor or the like, traction means mounted to each side member adjacent its rear free end to support and permit the movement of said frame means over the terrain, a pair of upwardly extending spaced parallel boom arms connected at one end to each free end of said side members in pivotal relationship therewith, connecting and bracing means secured to each boom arm at a point below the approximate midpoint of each boom arm and spanning the distance therebetween, double acting piston means mounted on said frame means forward of said traction means, the piston arm of said piston means connected at its free end to said connecting and bracing means of said boom arms for vertically pivoting said boom arms to both sides of a vertical plane over its pivotal point, transverse connecting means secured to the forward free end of each boom arm and spanning the distance therebetween, and grapple means secured to said transverse connecting means, said grapple means including a pair of coacting jaw units pivotally joined and movable toward and away from each other, and means for moving said jaw units to open and close said grapple, the vertical pivotal movement of said boom arms forward of said pivotal point being limited in order for the grapple means when carrying a load to be cradled against the boom arms so that the load and boom arms are firmly rested in a substantially rigid carrying position above the traction means and the center of gravity of the load, the boom arms and the grapple means being substantially centered over the traction means.

3. A wood handling and transporting device of the character described comprising rigid frame means lying in a substantially horizontal plane, said frame means including rearwardly extending spaced side members connected at their forward ends by a front frame member, connecting means secured to the front frame member for connecting the frame means to a tractor or the like, traction means mounted on each side member adjacent its rear free end to support and permit the movement of said frame means over the terrain, a pair of upwardly extending spaced parallel boom arms connected at one end to each free end of said side members in pivotal relationship therewith, connecting and bracing means secured to each boom arm at a point below the approximate midpoint of each boom arm and spanning the distance therebetween, double acting piston means mounted on said frame means forward of said traction means, the piston arm of said piston means connected at its free end to said connecting and bracing means of said boom arms for vertically pivoting said boom arms to both sides of a vertical plane over its pivotal point, transverse connecting means secured to the forward free end of each boom arm and spanning the distance therebetween, a first and second pair of spaced support arms, each pair pivotally connected at one end to said transverse connecting means and in spaced relation thereon and pivotally connected at each opposite end to a pair of spaced parallel rear grapple members, each pair of grapple members connected to one another at their top free ends to a transverse rod in pivotal relationship therewith, and piston means connected at one end to said transverse connecting means and at its opposite end to said transverse rod to move each pair of grapple members to open and closed positions, the vertical pivotal movement of said boom being limited in order for the support arms and grapple members when carrying a load to be cradled against the boom arms, so that the load and boom arms are firmly rested in a substantially rigid carrying position above the traction means and the center of gravity of the load, the boom arms and the grapple members being substantially centered over the traction means.

References Cited in the file of this patent

UNITED STATES PATENTS

| | | |
|---|---|---|
| 1,603,573 | Baker | Oct. 19, 1926 |
| 1,864,676 | Smith | June 28, 1932 |
| 2,418,251 | Drott | Apr. 1, 1947 |
| 2,550,185 | Busch | Apr. 24, 1951 |
| 2,639,048 | Glashaw | May 19, 1953 |
| 2,651,424 | Johnson | Sept. 8, 1953 |